US007764521B2

(12) United States Patent
Lin et al.

(10) Patent No.: US 7,764,521 B2
(45) Date of Patent: Jul. 27, 2010

(54) APPARATUS AND METHOD FOR PROVIDING MULTIPLE FUNCTIONS AND PROTECTIONS FOR A POWER CONVERTER

(75) Inventors: Tzu-Chen Lin, Taipei (TW); Pei-Lun Huang, Taoyuan County (TW)

(73) Assignee: Richtek Technology Corp., Hsinchu (TW)

( * ) Notice: Subject to any disclaimer, the term of this patent is extended or adjusted under 35 U.S.C. 154(b) by 451 days.

(21) Appl. No.: 11/826,208

(22) Filed: Jul. 13, 2007

(65) Prior Publication Data
US 2008/0278973 A1 Nov. 13, 2008

(30) Foreign Application Priority Data
May 11, 2007 (TW) .............................. 96116930 A (51) Int. Cl.
H02M 3/335 (2006.01)
(52) U.S. Cl. ...................................... 363/21.16; 363/97
(58) Field of Classification Search ............. 363/21.12, 363/21.16, 97, 131
See application file for complete search history.

(56) References Cited

U.S. PATENT DOCUMENTS

| | | | | |
|---|---|---|---|---|
| 5,086,382 A * | 2/1992 | Feldtkeller et al. | ....... | 363/21.16 |
| 5,982,640 A * | 11/1999 | Naveed et al. | ........... | 363/21.15 |
| 7,061,780 B2 * | 6/2006 | Yang et al. | ............... | 363/21.16 |
| 7,394,670 B2 * | 7/2008 | Koike | ....................... | 363/21.16 |
| 7,492,615 B2 * | 2/2009 | Morota et al. | ............ | 363/21.16 |
| 7,545,654 B2 * | 6/2009 | Berghegger | .............. | 363/21.16 |
| 7,558,093 B1 * | 7/2009 | Zheng | ......................... | 363/97 |
| 2005/0213355 A1* | 9/2005 | Koike | ....................... | 363/21.16 |
| 2006/0050539 A1* | 3/2006 | Yang et al. | ............... | 363/21.16 |

* cited by examiner

*Primary Examiner*—Jeffrey L Sterrett
(74) *Attorney, Agent, or Firm*—Rosenberg, Klein & Lee (57) ABSTRACT

A power converter has a transformer including a primary winding connected between a power input and a power switch, the power switch is switched to deliver power from the power input to a power output, an auxiliary winding provides an induced voltage in such a manner that when the power switch is at a first switch state, the induced voltage reflects an input information of the power converter, and when the power switch is at a second switch state, the induced voltage reflects an output information of the power converter. Two detection signals are generated from the input and output information, respectively, to implement multiple functions and protections.

20 Claims, 8 Drawing Sheets

APPARATUS AND METHOD FOR PROVIDING MULTIPLE FUNCTIONS AND PROTECTIONS FOR A POWER CONVERTER

FIELD OF THE INVENTION

The present invention is related generally to a power converter and, more particularly, to an apparatus and method for providing multiple functions and protections for a power converter.

BACKGROUND OF THE INVENTION

As the technology is improved, more and more functions and protection mechanisms are integrated in a controller of power converter, such as over-voltage protection, under-voltage protection, constant output power control, and constant voltage-second control, etc. However, adding these functions and protection mechanisms usually requires an increase in the number of pins on the controller chip of the power converter, thereby increasing the elements and cost. In order to decrease the pin count, there was proposed a concept of multi-function pin, i.e., utilizing a pin to provide a variety of functions. For example, U.S. Pat. No. 6,643,153 to Balakrishnan et al. disclosed a method and apparatus providing a multi-function terminal for a power supply controller. However, the implementation of these functions and protections always requires input information or output information of the power converter. For instance, for a power converter, input over-voltage protection requires detection on the input voltage of the power converter, and output over-voltage protection requires detection on the output voltage of the power converter. Unfortunately, a conventional multi-function pin can only obtain either input information or output information, and thus can only implement those functions or protections that use either input information or output information.

Thus, it is desired an apparatus and method capable of obtaining both input information and output information of a power converter so as to implement multiple functions or protections for the power converter.

SUMMARY OF THE INVENTION

An object of the present invention is to provide an apparatus and method for providing multiple functions or protections for a power converter.

In a power converter, according to the present invention, a transformer has a primary winding, a secondary winding and an auxiliary winding, the current of the primary winding is switched to deliver power from a power input to a power output, and the auxiliary winding provides an induced voltage by inductively coupling the primary or secondary winding in such a manner that when the power switch is at a first switch state, the induced voltage reflects an input information of the power converter, and when the power switch is at a second switch state, the induced voltage reflects an output information of the power converter. Two detection signals are generated as the input and output information, respectively, to implement multiple functions and protections.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 1:
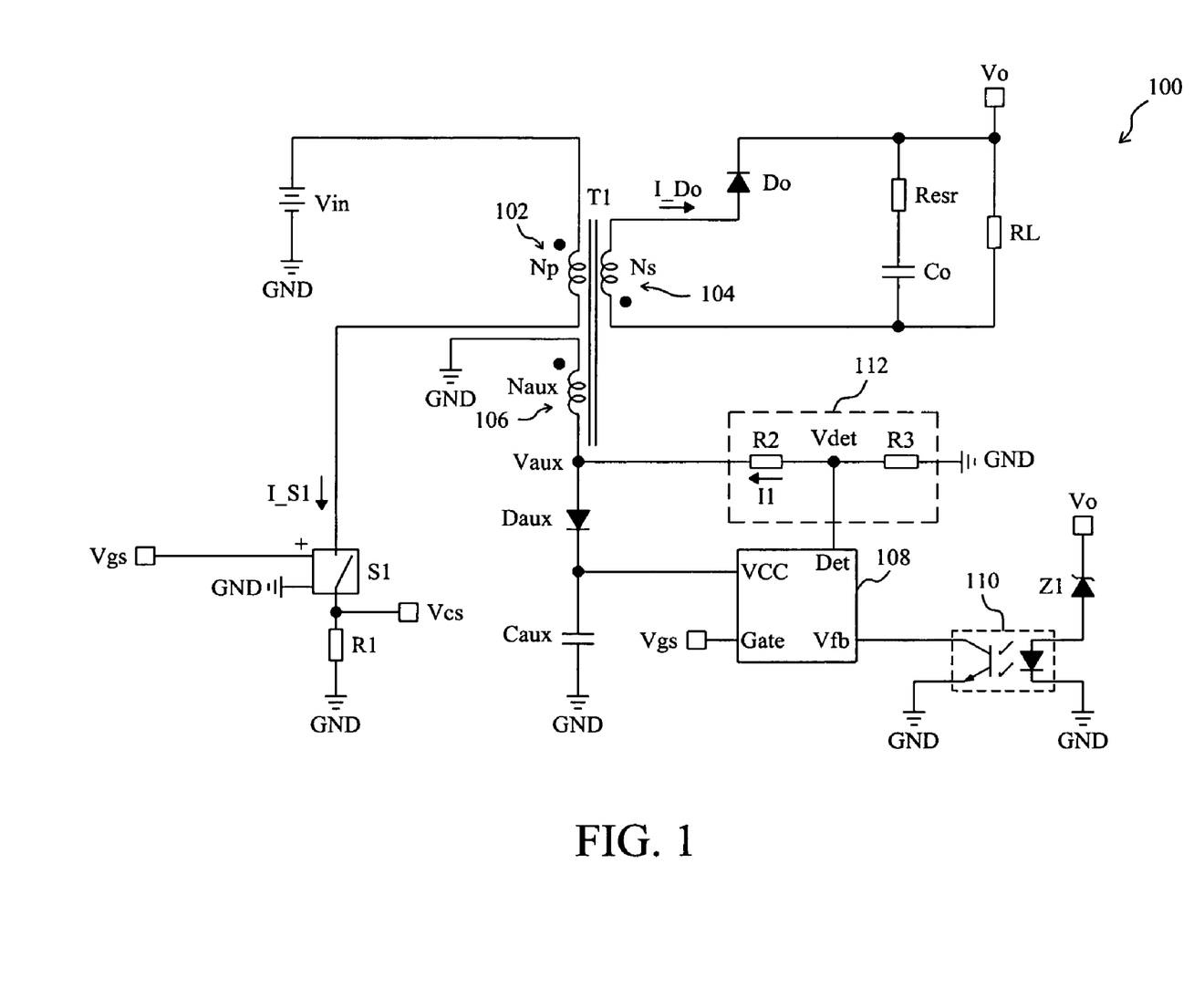
FIG. 1 shows an embodiment according to the present invention.

FIG. 1 shows an embodiment of a flyback converter 100, which includes a transformer T1 having a primary winding 102 connected between a power input Vin and a power switch S1, a secondary winding 104 connected to a power output Vo via a diode Do, and an auxiliary winding 106 for providing a voltage Vaux as the source of a controller 108. The controller 108 provides a control signal Vgs to switch the power switch S1 so as to deliver power from the power input Vin to the power output Vo. An opto-coupler 110 is connected between the power output Vo and a feedback terminal Vfb of the controller 108 so as to feed back the output voltage Vo to the feedback terminal Vfb for regulating the output voltage Vo. In particular, the auxiliary winding 106 is connected to a detection terminal Det of the controller 108 via a resistor R2, a resistor R3 is connected between the detection terminal Det and ground GND, and thus the resistors R2 and R3 constitute a voltage divider as a detection circuit 112 for detecting the induced voltage Vaux, thereby reflecting the input information and the output information to the controller 108.

Figure 2:
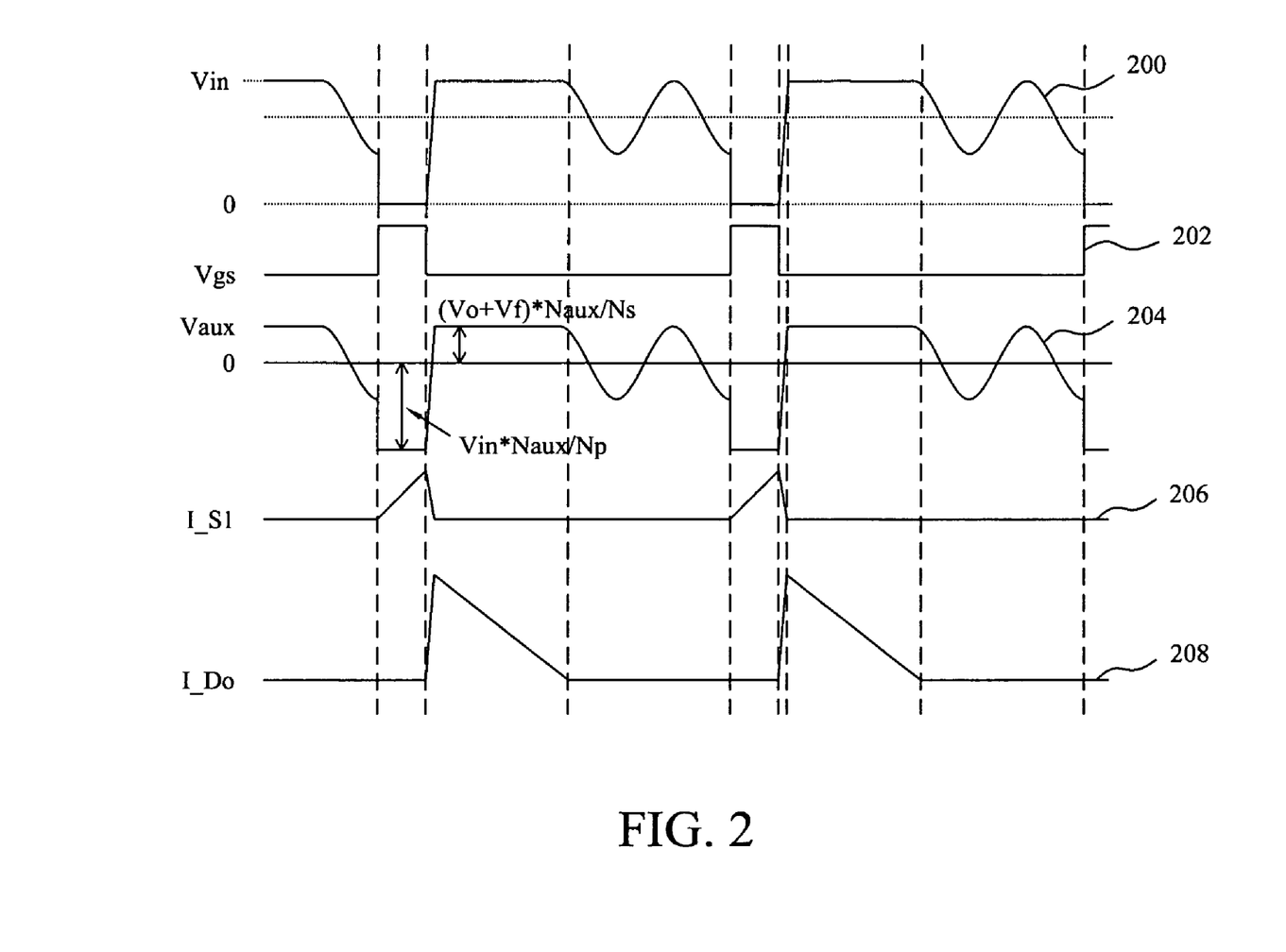
FIG. 2 is a waveform diagram of various signals in the power converter of FIG. 1.

FIG. 2 is a waveform diagram of various signals in the flyback converter 100, in which waveform 200 represents the voltage across over the power switch S1, waveform 202 represents the control signal Vgs, waveform 204 represents the induced voltage Vaux, waveform 206 represents the input current I_S1 which flows through the power switch S1, and waveform 208 represents the output current I_Do which flows through the diode Do. During the control signal Vgs is at high level, as shown by the waveform 202, the power switch S1 conducts the current I_S1, as shown by the waveform 206, and thus, according to the transformer theory, the auxiliary winding 106 induces the input voltage Vin on the primary winding 102 to thereby generate the induced voltage $$Vaux = -Vin \times Naux/Np, \qquad [\text{EQ-1}]$$

where Naux is the number of turns in the auxiliary winding 106 and Np is the number of turns in the primary winding 102. As can be seen from the equation EQ-1 and the waveform 204, during the power switch S1 is on, the induced voltage Vaux has negative values. In this embodiment, the controller 108 further has a function of prohibiting the voltage Vdet on the detection terminal Det to be less than zero, and thus a current I1 flows from the detection terminal Det toward the auxiliary winding 106 via the resistor R2. The current flowing through the resistor R2 can then be derived from the equation EQ-1 as $$I1=(V_{in}\times N_{aux}/N_p)/R2. \quad \text{[EQ-2]}$$

Figure 3:
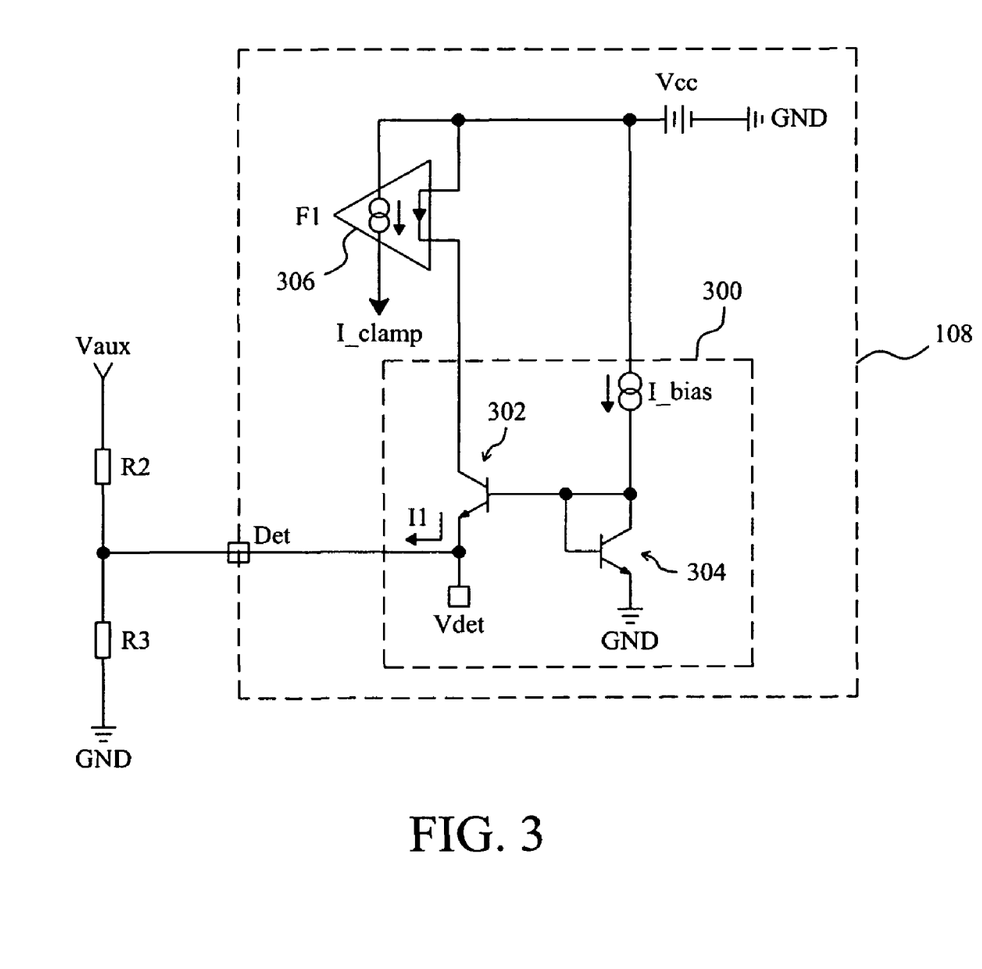
FIG. 3 shows an embodiment of a clamp circuit for limiting the voltage on the detection terminal of FIG. 1.

As shown in FIG. 3, an amplifier 306 further amplifies the current I1 to generate a clamping current $$I\_clamp=F1\times(V_{in}\times N_{aux}/N_p)/R2, \quad \text{[EQ-3]}$$

where F1 is the gain of the amplifier 306. A number of ways can be used to prohibit the voltage Vdet on the detection terminal Det from being less than zero. For example, a clamp circuit can be used to clamp the voltage Vdet, as shown in the embodiment of FIG. 3, in which a clamp circuit 300 includes a pair of transistors 302 and 304 and a bias current source I_bias connected to the transistor 304. During the power switch S1 is on, the induced voltage Vaux is negative, and thus the voltage Vdet on the detection terminal Det is 0.

During the power switch S1 is off, the secondary winding 104 generates the output current I_Do to charge a capacitor Co so as to produce the output voltage Vo, as shown by the waveforms 202 and 208, and thus, according to the transformer theory, the auxiliary winding 106 induces the voltage on the secondary winding 104 to thereby generate the induced voltage $$V_{aux}=(V_o+V_f)\times N_{aux}/N_s, \quad \text{[EQ-4]}$$

where Vf is the forward voltage across over the diode Do and Ns is the number of turns in the secondary winding 104. As shown in the equation EQ-4, during the power switch S1 is off, the induced voltage Vaux has positive values, and thus the resistors R2 and R3 of the detection circuit 112 divide the induced voltage Vaux to generate the detection voltage $$V_{det}=[(V_o+V_f)\times N_{aux}/N_s]\times R3/(R2+R3). \quad \text{[EQ-5]}$$

As can be seen from the equations EQ-3 and EQ-5, during the power switch S1 is on, the induced voltage Vaux is related to the input voltage Vin, and therefore, a signal I_clamp reflecting the input information can be obtained; while during the power switch S1 is off, the induced voltage Vaux is related to the output voltage Vo, and therefore, a signal Vdet reflecting the output information can be obtained. As such illustrated, with the induced voltage Vaux to obtain the input information and the output information, a variety of functions and protection mechanisms can be implemented.

Figure 4:
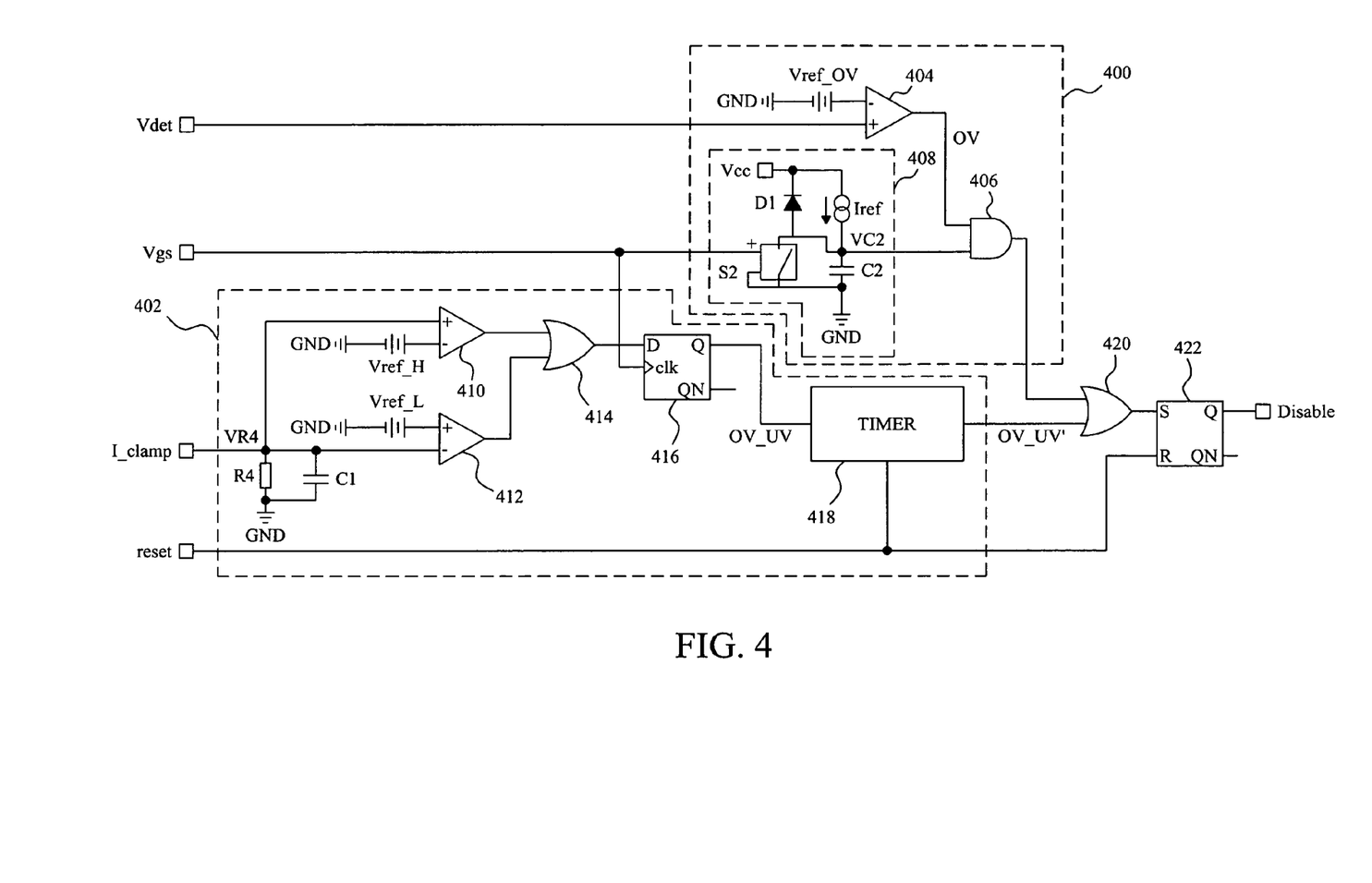
FIG. 4 shows an embodiment implementing an input under-voltage protection, an input over-voltage protection, and an output over-voltage protection upon the signal from the detection terminal of FIG. 1.

FIG. 4 shows an embodiment implementing an input under-voltage protection, an input over-voltage protection, and an output over-voltage protection upon the signal on the detection terminal Det of FIG. 1. In an output over-voltage protection circuit 400, during the power switch S1 is off, a comparator 404 compares the voltage Vdet on the detection terminal Det with a reference voltage Vref_OV. If the detection voltage Vdet is higher than the reference voltage Vref_OV, a comparison signal OV is generated such that the flip-flop 422 triggers a disable signal Disable to disable the controller 108. A blank circuit 408 is used to blank the voltage spike resulted from the leakage flux of the transformer T1 during the power switch S1 is off. In an input over-voltage and under-voltage protection circuit 402, during the power switch S1 is on, the clamp current I_clamp flows through a resistor R4 to generate a voltage VR4. Since the current I_clamp is proportional to the input voltage Vin, the voltage VR4 is also proportional to the input voltage Vin. A comparator 410 compares the voltage VR4 with a high-threshold reference voltage Vref_H. If the voltage VR4 is higher than the reference voltage Vref_H, the comparator 410 generates a signal such that a flip-flop 416 triggers a signal OV_UV for a timer 418. After a period of time, if the voltage VR4 is still higher than the reference voltage Vref_H, the timer 418 signals the flip-flop 422 by a signal OV_UV' to trigger the disable signal Disable to disable the controller 108. Similarly, a comparator 412 compares the voltage VR4 with a low-threshold reference voltage Vref_L. If the voltage VR4 is less than the reference voltage Vref_L, the comparator 412 generates a signal such that the flip-flop 416 triggers the signal OV_UV for the timer 418. After a period of time, if the voltage VR4 is still less than the reference voltage Vref_L, the timer 418 signals the flip-flop 422 by the signal OV_UV' to trigger the disable signal Disable to disable the controller 108.

As can be seen from the output over-voltage protection circuit 400 shown in FIG. 4, there is no need for any signals from the opto-coupler 110 for implementing the output over-voltage protection, and thus the number of elements and cost are saved.

Figure 5:
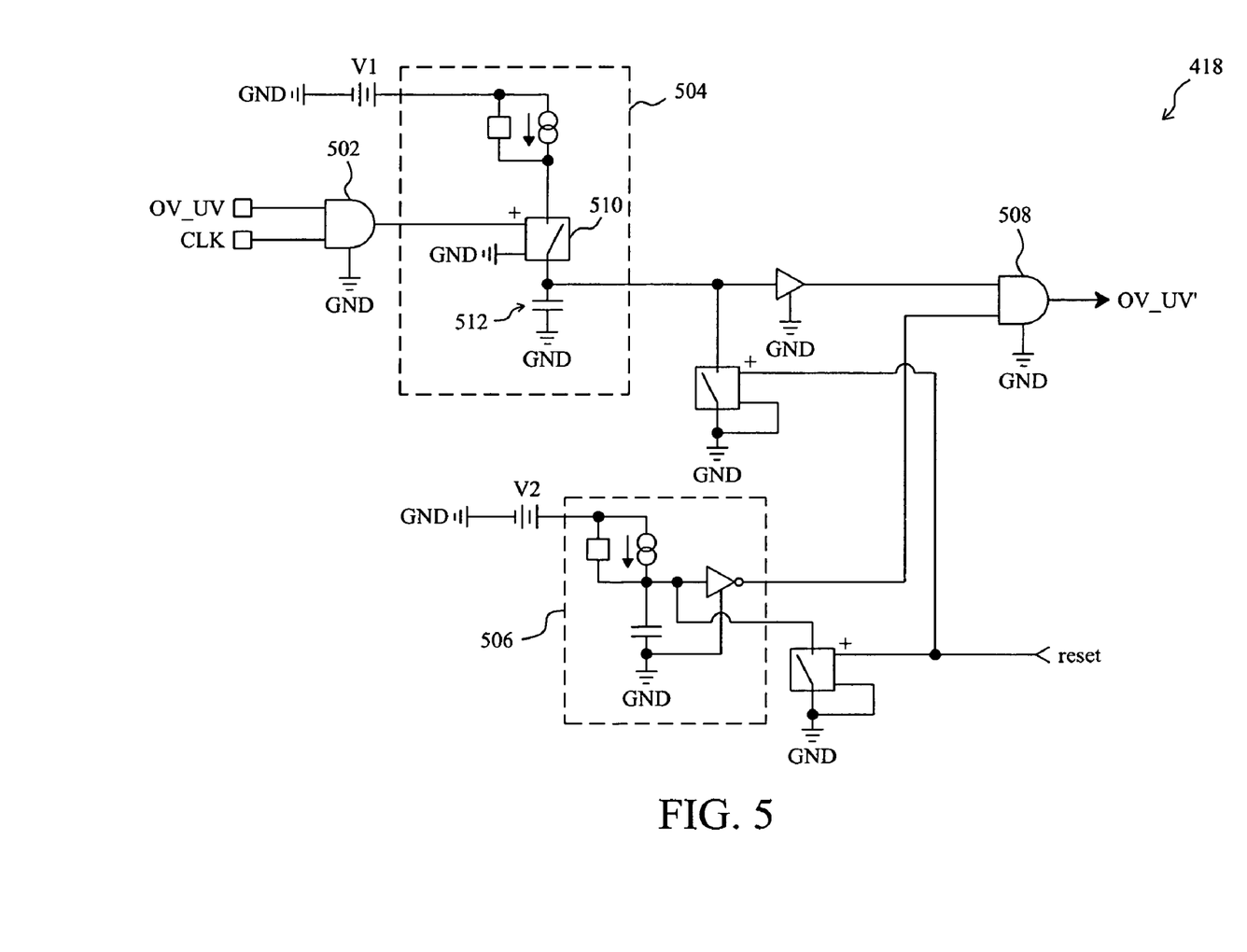
FIG. 5 shows an embodiment for the timer of FIG. 4.

FIG. 5 shows an embodiment for the timer 418 in FIG. 4, which includes an AND gate 502 for outputting a signal to a pulse accumulator 504 in response to the signal OV_UV of the flip-flop 416 and a clock CLK. When the signal OV_UV is at high level, the clock CLK switches the switch 510 so as to charge a capacitor 512. After the signal OV_UV is maintained at high level for a number of cycles of the clock CLK, an AND gate 508 triggers the signal OV_UV'. A short period circuit 506 is used to blank the output of the pulse accumulator 504 when the flyback converter 100 is first started so as to prevent the flyback converter 100 from operating in a wrong range of the input voltage Vin when being activated. When the flyback converter 100 is activated, it can obtain the input voltage Vin more precisely than that can be obtained by conventional arts without detecting the input voltage Vin.

Figure 6:
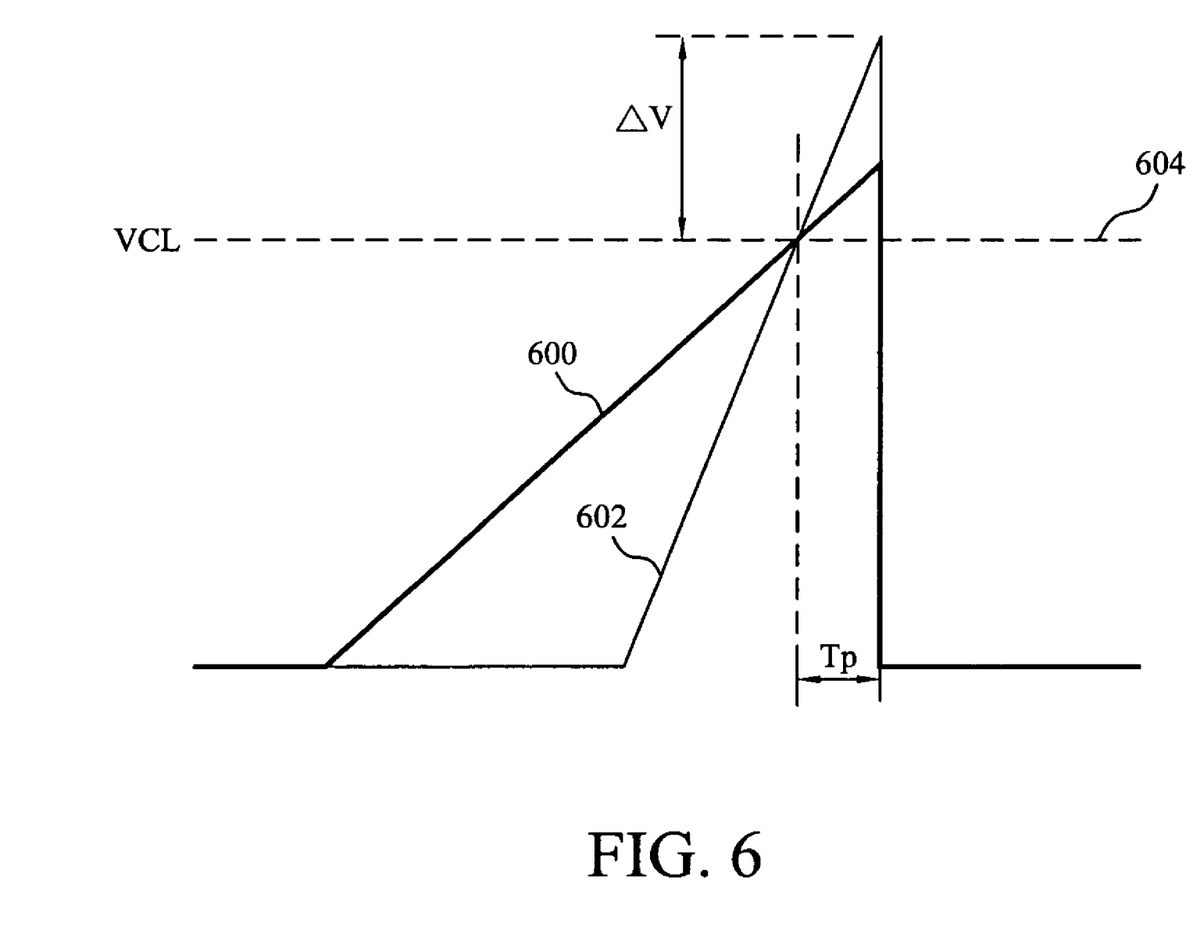
FIG. 6 illustrates the propagating delay when a power converter maintains a constant output power.
Figure 7:
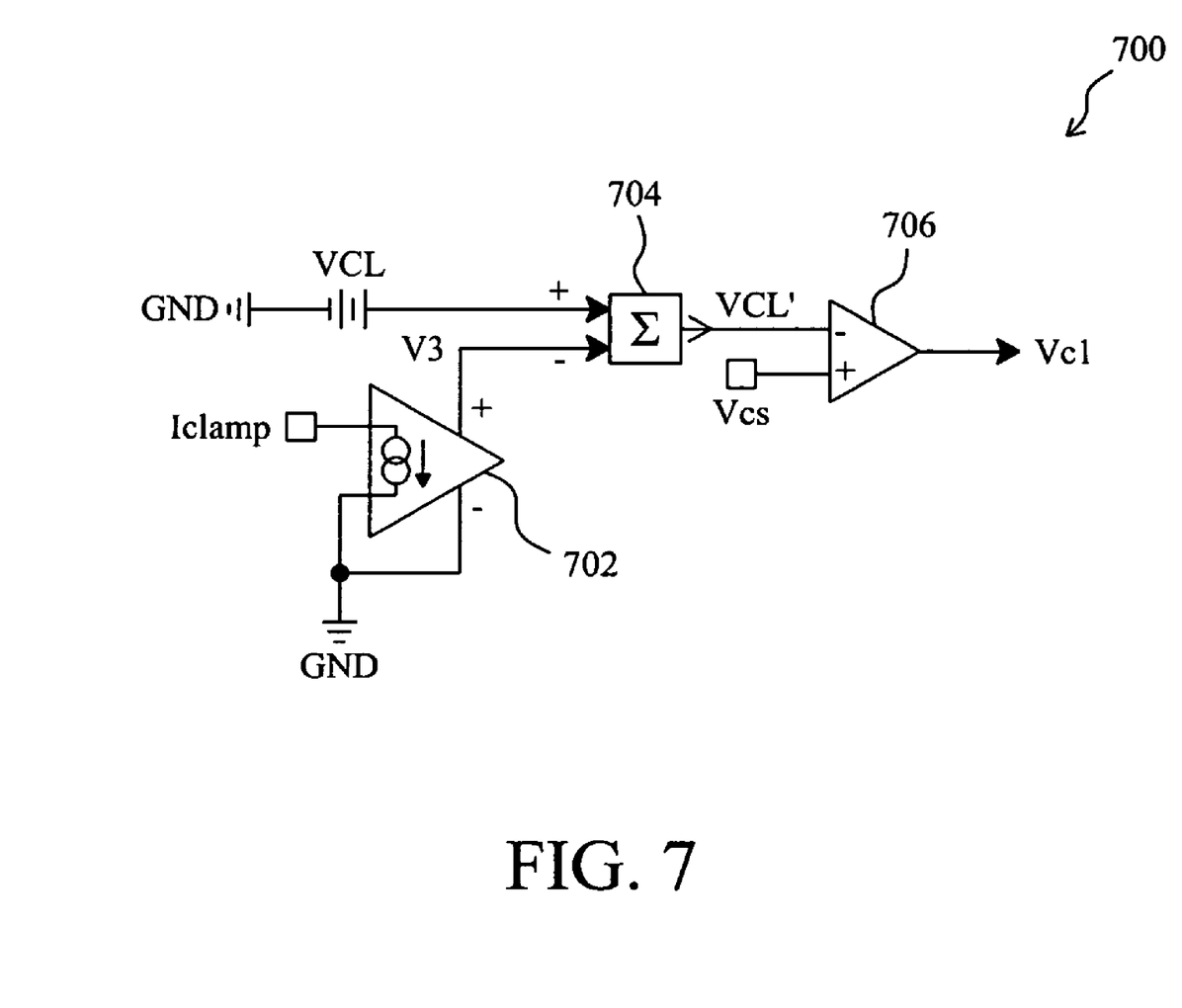
FIG. 7 shows an embodiment implementing a compensation to the propagating delay upon the signal from the detection terminal of FIG. 1.

FIG. 6 illustrates the propagating delay when a power converter maintains constant output power, in which waveform 600 represents the voltage Vcs across over the resistor R1 at low input voltage Vin, waveform 602 represents the voltage Vcs across over the resistor R1 at high input voltage Vin, and waveform 604 represents a current limit threshold VCL. Referring to FIG. 1, in a constant output power control, in order to maintain the output power of the flyback converter 100 fixed, the peak value of the current I_S1 needs to be restricted. In this embodiment, the current I_S1 is detected depending on the voltage Vcs across over the resistor R1. When the current sense signal Vcs increasingly reaches the current limit threshold VCL, as shown by the waveforms 600 and 604 in FIG. 6, the controller 108 will turn off the power switch S1. However, a propagating delay Tp exists between the time points when the current sense signal Vcs increasingly reaches the current limit threshold VCL and when the power switch S1 is completely off, causing the peak value of the current sense signal Vcs to exceed the current limit threshold VCL. Additionally, when the input voltage Vin is different, the increasing slop of the current I_S1 is also different. In other words, the increasing slop of the voltage Vcs will vary with the input voltage Vin. When the input voltage Vin is higher, the increasing slop of the voltage Vcs is steeper, as shown by the waveform 602. When the input voltage Vin is lower, the increasing slop of the voltage Vcs is less steep, as shown by the waveform 600. Therefore, in different input voltage Vin, the peak value of the current I_S1 is different, causing different output powers. As can be seen from FIGS. 1 and 6, the changes of voltage Vcs during the propagating delay Tp is $$\Delta V=(V_{in}\times T_p/L_m)\times R1, \quad \text{[EQ-6]}$$

where Lm is the inductance of the primary winding 102. Thus, the effect caused by the propagating delay Tp can be compensated by subtracting $\Delta V$ from the current limit threshold VCL in advance. FIG. 7 shows an embodiment implementing a compensation to the propagating delay upon the signal on the detection terminal Det of FIG. 1. In a constant output power circuit 700, an amplifier 702 generates a voltage based on the current I_clamp as $$V3 = K \times I\_clamp, \quad [EQ-7]$$

where K is the gain of the amplifier 702. Since the current I_clamp is related to the input voltage Vin, there is no need to add any sensing resistors to sense the input voltage Vin. A combiner 704 subtracts the voltage V3 from the current limit threshold VCL and then generates a modified current limit threshold VCL'. A comparator 706 compares the voltages VCL' and Vcs. When the voltage Vcs reaches the voltage VCL', a limiting signal Vcl is generated to turn off the power switch S1. By selecting the appropriate gain $$K = (Tp/Lm) \times (R2/F1) \times (Np/Naux) \times R1, \quad [EQ-8]$$

the voltage V3 can be equal to $\Delta V$ shown in the equation EQ-6, thereby compensating the propagating delay Tp. Additionally, the current I_clamp varies with the input voltage Vin, and thus, when the input voltage Vin changes, the voltage V3 also changes to maintain the same output power.

Figure 8:
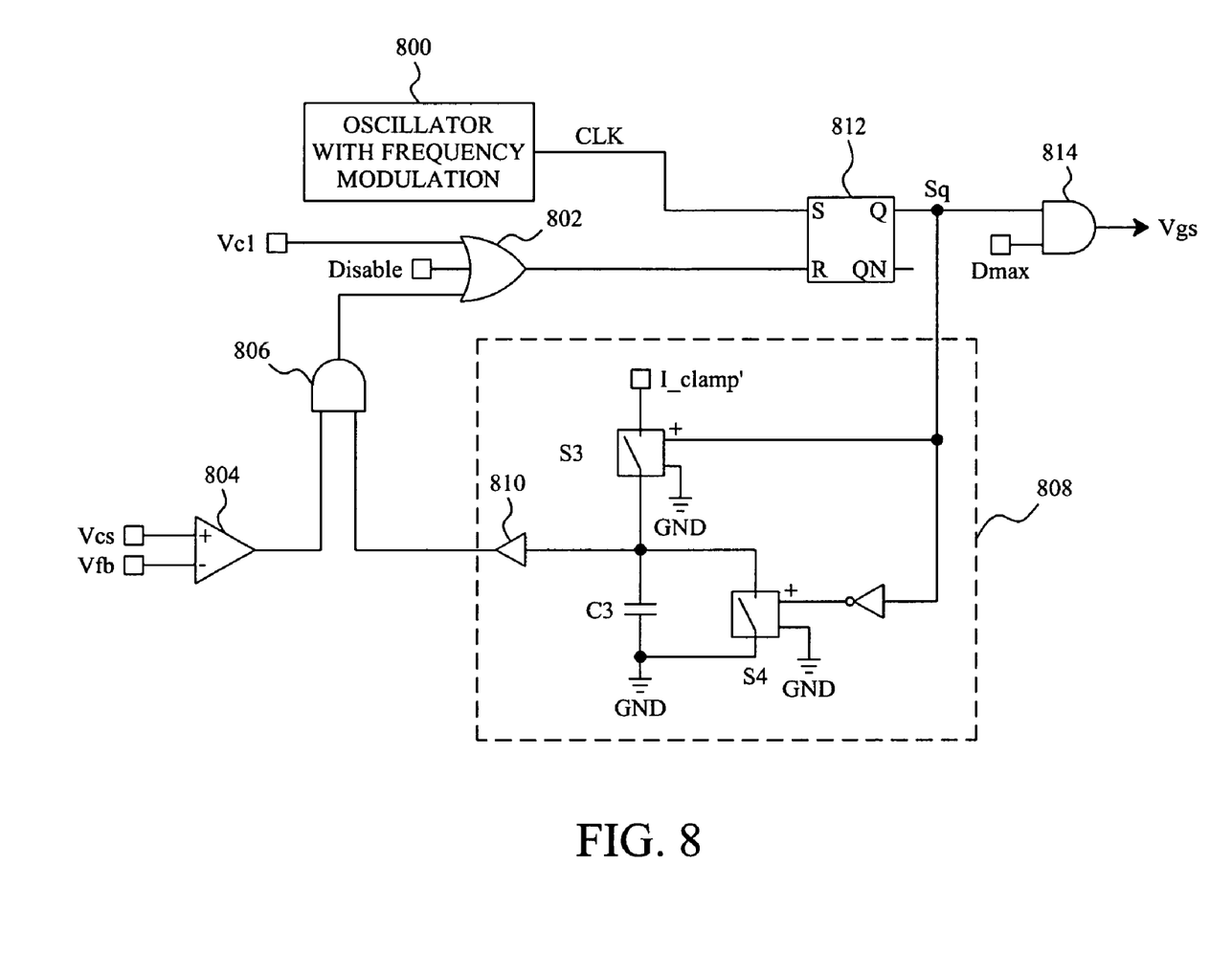
FIG. 8 shows an embodiment implementing a constant voltage-second control upon the signal from the detection terminal of FIG. 1.

FIG. 8 shows an embodiment implementing a constant voltage-second control upon the signal on the detection terminal Det of FIG. 1, in which a pulse width modulation (PWM) comparator 804 generates a PWM output according to the voltage Vcs across over the resistor R1 and the voltage on the feedback terminal Vfb for a reset input R of a flip-flop 812 via an AND gate 806 and an OR gate 802, an oscillator 800 with frequency modulation provides a clock CLK for a set input S of the flip-flop 812. The flip-flop 812 generates a signal Sq according to the clock CLK and the output of the OR gate 802. An AND gate 814 generates the control signal Vgs according to the signal Sq from the flip-flop 812 and a signal Dmax which represents the maximum duty. In a constant voltage-second control circuit 808, the current I_clamp' is a mirror one of the current I_clamp, and is provided to a capacitor C3 via a switch S3, and the signal Sq controls the switches S3 and S4 so as to charge and discharge the capacitor C3. When the output power of the flyback converter 100 is lower than a threshold, the voltage VC3 on the capacitor C3 will be greater than the pre-set threshold in the comparator 810 such that the comparator 810 triggers a signal to blank the output of the PWM comparator 804. The purpose of the constant voltage-second control circuit 808 is to prevent the duty cycle of the flyback converter 100 from being too short and keep a constant voltage-second even though the input voltage Vin is varying when it is at light loading, thereby improving the performance of the flyback converter 100.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation to encompass all such modifications and similar arrangements.

What is claimed:

1. An apparatus for providing multiple functions or protections for a power converter including a transformer having a primary winding connected between a power input and a power switch, and a secondary winding connected to a power output, and operative to deliver power from the power input to the power output by switching the power switch by a control signal, the apparatus comprising:

an auxiliary winding for generating an induced voltage by inductively coupling the primary or secondary winding in such a manner that when the power switch is at a first switch state, the induced voltage reflects an input information of the power converter, and when the power switch is at a second switch state, the induced voltage reflects an output information of the power converter;

a detection circuit for obtaining the input and output information from the induced voltage so as to implement the multiple functions or protections, the detection circuit including a first resistor connected between the auxiliary winding and a detection terminal for generating a first detection signal including the input information from the induced voltage when the power switch is at the first switch state, and a second resistor serially connected to the first resistor via the detection terminal for generating a second detection signal including the output information by dividing the induced voltage when the power switch is at the second switch state, whereby the first and second detection signals are used to implement the multiple functions or protections; and a constant voltage-second control circuit for monitoring the first detection signal to prevent the power converter from having a duty cycle too short and keep a constant voltage even though the input voltage at the power input is varying when the power converter is at a light loading.

2. The apparatus of claim 1, further comprising a constant output power circuit for monitoring the first detection signal such that the power converter maintains a substantially constant output power.

3. The apparatus of claim 2, wherein the constant output power circuit comprises:

an amplifier for amplifying the first detection signal;

a combiner for subtracting the amplified signal from a predetermined value to thereby determine a limit threshold; and a comparator for comparing the limit threshold with a signal representative of the current flowing through the power switch to determine a limit signal which is used to turn off the power switch when the signal representative of the current flowing through the power switch increasingly reaches the limit threshold.

4. The apparatus of claim 1, further comprising an input over-voltage protection circuit for disabling the power converter when the first detection signal is higher than a threshold.

5. The apparatus of claim 4, wherein the input over-voltage protection circuit comprises a comparator for comparing the first detection signal with the threshold to determine a comparison signal which is used to disable the power converter when the first detection signal is higher than the threshold.

6. The apparatus of claim 5, wherein the input over-voltage protection circuit further comprises a timer for counting during the first detection signal is higher than the threshold, so as to disable the power converter once the counted time reaches a predetermined value.

7. The apparatus of claim 1, further comprising an input under-voltage protection circuit for disabling the power converter when the first detection signal is lower than a threshold.

8. The apparatus of claim 7, wherein the input under-voltage protection circuit comprises a comparator for comparing the first detection signal with the threshold to determine a comparison signal which is used to disable the power converter when the first detection signal is lower than the threshold.

9. The apparatus of claim 8, wherein the input under-voltage protection circuit further comprises a timer for counting during the first detection signal is lower than the threshold, so as to disable the power converter once the counted time reaches a predetermined value.

10. The apparatus of claim 1, further comprising an output over-voltage protection circuit for disabling the power converter when the second detection signal is higher than a threshold.

11. The apparatus of claim 10, wherein the output over-voltage protection circuit comprises a comparator for comparing the second detection signal with the threshold to determine a comparison signal which is used to disable the power converter when the second detection signal is higher than the threshold.

12. The apparatus of claim 1, wherein the detection circuit further comprises a clamp circuit for clamping the voltage on the detection terminal from being less than zero.

13. A method for providing multiple functions or protections for a power converter including a transformer having a primary winding connected between a power input and a power switch, and a secondary winding connected to a power output, and operative to deliver power from the power input to the power output by switching the power switch by a control signal, the method comprising the steps of:

generating an induced voltage by an auxiliary winding inductively coupling to the primary or secondary winding in such a manner that when the power switch is at a first switch state, the induced voltage reflects an input information of the power converter, and when the power switch is at a second switch state, the induced voltage reflects an output information of the power converter;

generating a first detection signal from the input information;

generating a second detection signal from the output information; and monitoring the first detection signal for the power converter to maintain a substantially constant output power, the step of monitoring including:
    amplifying the first detection signal;
    subtracting the amplified signal from a predetermined value for determining a limit threshold; and
    comparing the limit threshold with a signal representative of the current flowing through the power switch for determining a limit signal to turn off the power switch when the signal representative of the current flowing through the power switch increasingly reaches the limit threshold;

whereby the first and second detection signals are used to implement the multiple functions or protections.

14. A method for providing multiple functions or protections for a power converter including a transformer having a primary winding connected between a power input and a power switch, and a secondary winding connected to a power output, and operative to deliver power from the power input to the power output by switching the power switch by a control signal, the method comprising the steps of:

generating an induced voltage by an auxiliary winding inductively coupling to the primary or secondary winding in such a manner that when the power switch is at a first switch state, the induced voltage reflects an input information of the power converter, and when the power switch is at a second switch state, the induced voltage reflects an output information of the power converter;

generating a first detection signal from the input information;

generating a second detection signal from the output information;

whereby the first and second detection signals are used to implement the multiple functions or protections; and monitoring the first detection signal to prevent the power converter from having a duty cycle too short and keep a constant voltage even though the input voltage at the power input is varying when the power converter is at a light loading.

15. The method of claim 14, further comprising the step of monitoring the first detection signal for the power converter to maintain a substantially constant output power.

16. The method of claim 14, further comprising the step of disabling the power converter when the first detection signal is higher than a threshold.

17. The method of claim 16, wherein the step of disabling the power converter when the first detection signal is higher than a threshold comprises the steps of:
    counting a time during the first detection signal is higher than the threshold; and
    triggering a disable signal for disabling the power converter once the counted time reaches a predetermined value.

18. The method of claim 14, further comprising the step of disabling the power converter when the first detection signal is lower than a threshold.

19. The method of claim 18, wherein the step of disabling the power converter when the first detection signal is lower than a threshold comprises the steps of:
    counting a time during the first detection signal is lower than the threshold; and
    triggering a disable signal for disabling the power converter once the counted time reaches a predetermined value.

20. The method of claim 14, further comprising the step of disabling the power converter when the second detection signal is higher than a threshold.

* * * * *